United States Patent [19]

Grant et al.

[11] Patent Number: 4,827,715
[45] Date of Patent: May 9, 1989

[54] CRANKCASE FUMES DISPOSAL SYSTEM

[75] Inventors: Robert C. Grant, Creve Coeur; John L. Johnson, Brimfield, both of Ill.

[73] Assignee: Caterpillar Inc., Peoria, Ill.

[21] Appl. No.: 126,973

[22] Filed: Nov. 30, 1987

[51] Int. Cl.$^4$ ................................ F01N 3/26
[52] U.S. Cl. ........................... 60/283; 60/324
[58] Field of Search ..................... 60/283, 324

[56] References Cited

U.S. PATENT DOCUMENTS

| | | |
|---|---|---|
| 2,916,020 | 12/1959 | Kolbe . |
| 2,969,940 | 1/1961 | Gengler .................. 60/283 |
| 3,241,535 | 3/1966 | Drysdale . |
| 3,630,031 | 12/1971 | Grainger .................. 60/305 |
| 3,630,032 | 12/1971 | Grainger .................. 60/308 |
| 3,630,182 | 12/1971 | Grainger . |
| 3,788,072 | 1/1974 | Burger .................... 60/324 |

Primary Examiner—Douglas Hart
Attorney, Agent, or Firm—Larry G. Cain

[57] ABSTRACT

Fumes disposal systems used with existing engines are complex, induce pollution and cause engine malfunction to occur. The present fumes disposal system overcomes these problems by utilizing the heat from the engine exhaust to heat a tubular member and cause excessive oil droplets, carbon particles and fumes to burn. The flow of exhaust from the engine is used to dissipate the remaining crankcase fumes insuring that any concentration of fumes are purged with the exhaust. Furthermore, the system controls the pressure within the crankcase of the engine.

20 Claims, 3 Drawing Sheets

CRANKCASE FUMES DISPOSAL SYSTEM

TECHNICAL FIELD

This invention relates generally to internal combustion engine systems and more particularly to disposal of crankcase fumes from an engine.

BACKGROUND ART

The crankcase of an engine must be vented in order to prevent an undue build-up of pressure and explosive vapors which have escaped past the piston rings into the crankcase while the engine is running. The fumes or vapors found in an engine crankcase include a portion of the engine lubricating oil either as a vapor or in a droplet form and unburned carbon particles coated with oil, the constituents being suspended in the fumes. Separators are commonly used to recover the oil droplets from the fumes. The remaining fumes are of an oily consistency, dark in color and have an odor which is offensive to smell.

An example of a crankcase ventilation system is disclosed in U.S. Pat. No. 2,916,020 issued to Adelbert E. Kolbe on Dec. 12, 1958. In such system, the crankcase fumes are separated into separated oil and gaseous fumes. The oil flows through openings in the block back into the pan. The remaining fumes are exhausted to the atmosphere through a vent tube.

Another example of a crankcase ventilation system directs the remainder of the crankcase fumes from the separator to the fan portion of an engine so that the fumes are dissipated in the cooling air. A drawback to such a system is that the oily fumes enter the radiator and cling to the fins. Dust particles flowing through the radiator are absorbed in the oil and the radiator becomes clogged resulting in overheating of the engine.

Another example of a crankcase ventilation system is disclosed in U.S. Pat. No. 3,241,535 issued to William R. Drysdale on Mar. 22, 1966. In such system, the crankcase fumes are drawn by intake manifold pressure from the crankcase through a tube to the intake manifold which delivers them to the combustion chamber.

Another example of a crankcase ventilation system is disclosed in U.S. Pat. No. 3,630,182 issued to Lewis M. D. Granger on Dec. 28, 1971. In this system, the crankcase fumes are drawn from the crankcase of the engine and mixed with fresh air. The mixture is fed through a heat exchanger to heat the gases and into an oil bath air cleaner air intake of the carburetor. A portion of the fumes and air are also fed to an exhaust-gas-pollution-burning device.

The oily carbon particles when recirculated through the intake manifold of an engine will tend to cling to the walls and cake thereupon. As heat from the engine combustion cycle is added to the oily carbon particles, the tendency for caking increases. Furthermore, caking near the valves will cause the valve seat to overheat and crack resulting in oil leakage past the seat and into the intake passage. Such oil compounds the caking problem by combining with the caking mixture forming a build-up which becomes excessive to the point where the engine malfunctions. If, however, the oily carbon particles and fumes are not recirculated through a combustion or burning process, the dark oily fumes emitted from the engine will pollute the atmosphere.

The present invention is directed to overcoming one or more of the problems as set forth above.

DISCLOSURE OF THE INVENTION

In one aspect of the present invention a crankcase fumes disposal system is provided for an engine having a crankcase, an oil separator mounted on the engine and is in fluid communication with the crankcase, an exhaust pipe and a conduit is connected to the pipe with the conduit having an inlet in fluid communication with the exhaust pipe. The system comprises means for forming a passage in heat absorbing relationship with the exhaust gases from the engine with the passage having an inlet and an outlet; and means for connecting the oil separator with the inlet of the passage so that the constituents within the fumes and the remainder of the fumes are dissipated with the exhaust gases being discharged from the engine.

In another aspect of the invention, an engine includes a crankcase, an oil separator mounted on the engine in fluid communication with the crankcase, an exhaust pipe, a conduit connected to the pipe with the conduit having an inlet in fluid communication with the exhaust pipe, means for forming a passage in heat absorbing relationship with the exhaust gases from the engine, the passage has an inlet; and an outlet and means for connecting the oil separator with the inlet of the passage so that the constituents within the crankcase fumes are burned and the remaider of the fumes are dissipated with the exhaust gases discharged from the engine.

The present invention provides a fumes disposal system which will reduce pollution of the atmosphere, eliminate engine malfunction associated with recirculation of oily fumes through the engine, prevent clogging of radiators, and control the pressure within an engine crankcase.

BEST MODE FOR CARRYING OUT THE INVENTION

Figure 1:
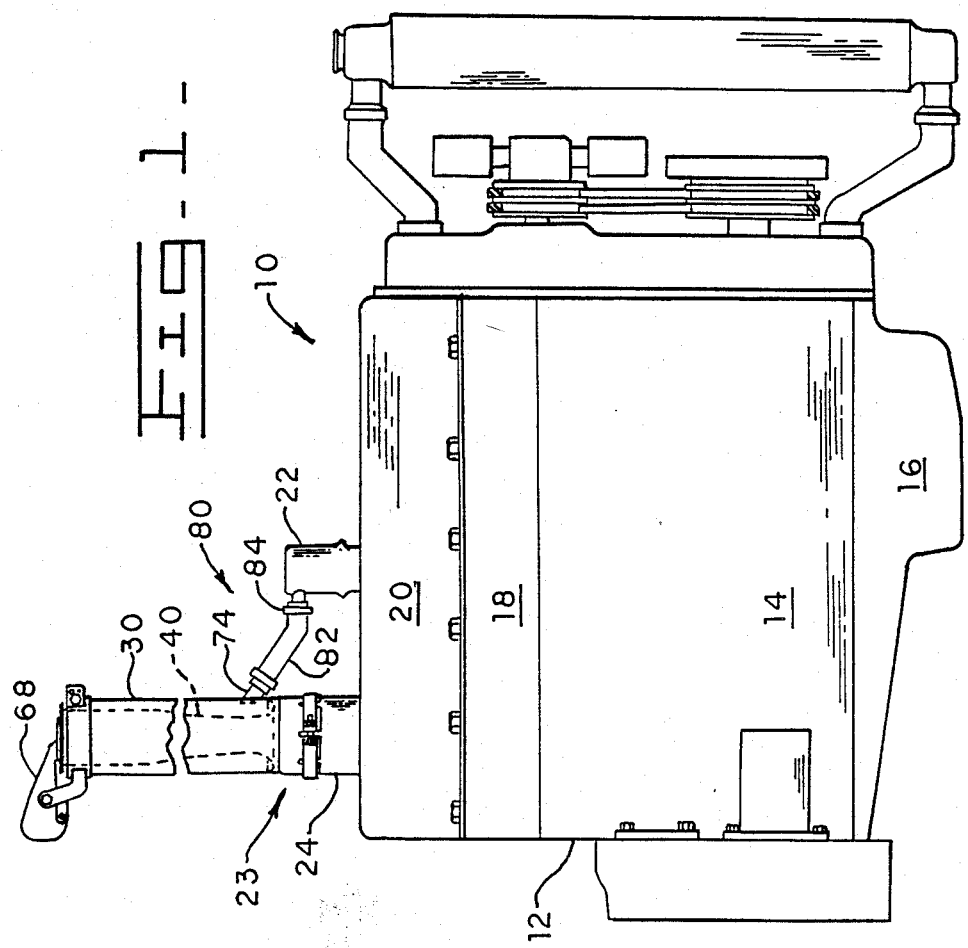
FIG. 1 is a side elevational view of an internal combustion engine embodying a crankcase fumes disposal system.

Referring to FIG. 1, a conventional engine 10 includes a cylinder block 12 having a crankcase 14 and an oil pan 16 attached thereto. A head 18 is attached to the block 12 and a valve cover 20 is removably attached to the head 18. Conventional passages and openings (not shown) in the block 12 and head 18 provide fluid communication between the crankcase 14 and the valve cover 20. An oil separator 22 is connected to the valve cover 20 and is in fluid communication with the crankcase. An exhaust system 23 includes an exhaust manifold (not shown) attached to one side of the head 18 and a muffler with only the outlet pipe shown at 24 is attached to the manifold and is in fluid communication with the exhaust manifold.

Figure 2:
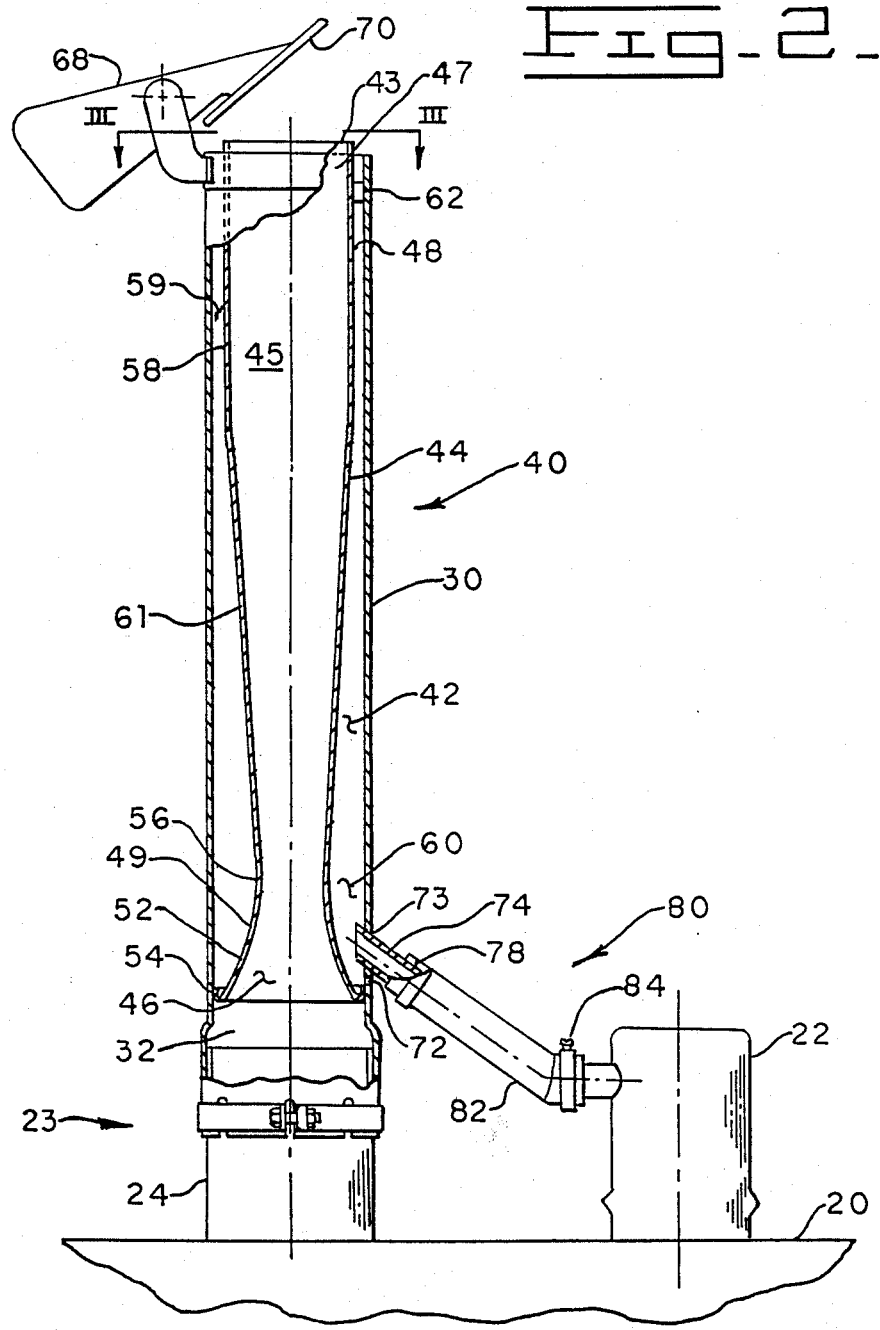
FIG. 2 is a partial sectional view disclosing a portion of the engine crankcase fumes disposal system.

A vertically disposed cylindrically shaped conduit 30 is removably connected to the pipe 24 in a conventional manner such as a clamp and bolt arrangement. As best shown in FIG. 2, the conduit 30 has an inlet 32 in communication with the pipe 24 from the engine 10.

Figure 3:
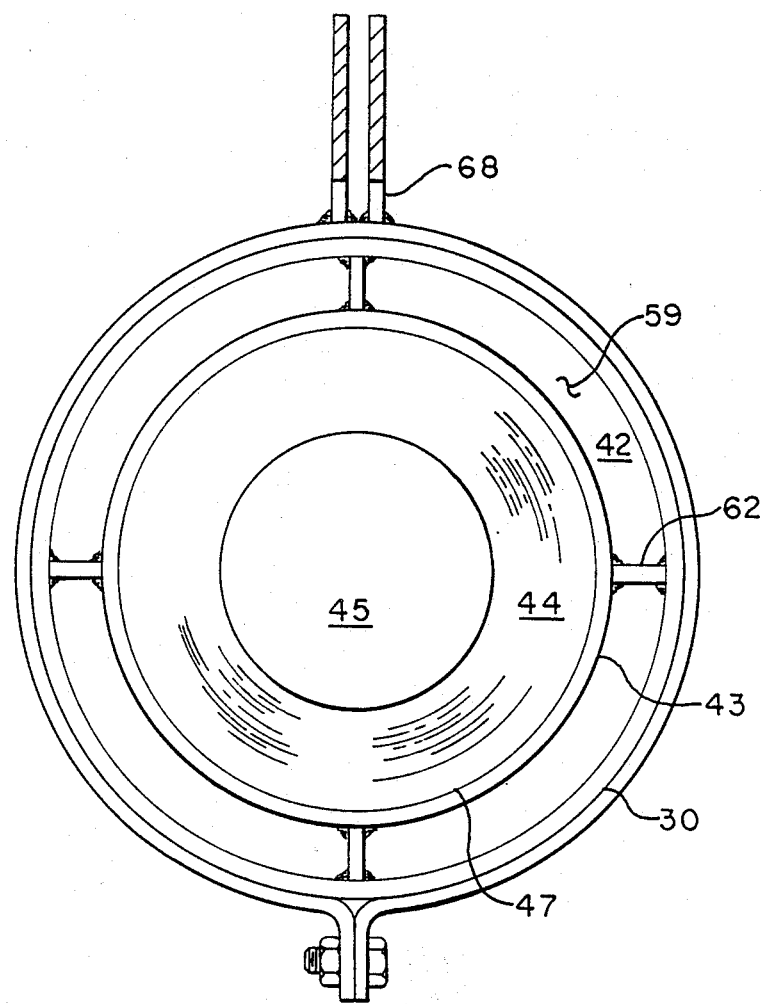
FIG. 3 is a view taken along line III—III of FIG. 2.

A means 40 is provided for forming a passage 42 in heat absorbing relationship with the exhaust gases from the engine 10. The passage 42 is sufficiently large to accommodate fumes from the engine 10 and has an outlet 43. The forming means 40 includes a formed member 44 disposed substantially within the conduit 30 and fixedly attached thereto. A passage 45 is formed inside the member 44. The passage 45 has an inlet 46 adjacent the connection of the conduit 30 to the engine and an outlet 47. The member 44 has a top portion 48 and a bottom portion 49. The bottom portion 49 has a flared portion 52 formed to substantially the same diameter as the inside of the cylindrical conduit 30. An outer flange 54 of the flared portion 52 is sealingly attached to the conduit 30 by any conventional manner such as welding. From the outer flange 54 moving upward the tubular member 44 has a necked down portion 56 and an expanded portion 58 which has a diameter smaller than the inside of the conduit 30 to provide a preestablished cross-sectional annular area 59 near the outlet 43 of the passage 42. A preestablished cross-sectional area 60 is also provided as a part of passage 42 and is positioned at the end opposite the outlet 43. The area 60 is of a larger size than the area 59. A transition portion 61 connects the necked down portion 56 and the expanded portion 58. The area 59 is between the conduit 30 and the member 44 and is sized to maintain a preestablished pressure within the engine crankcase 14 when the engine 10 is operational. The expanded portion 58 takes on an elongated cylindrical configuration near the top portion 48 and is symmetrically positioned within the conduit 30 by a plurality of spacer plates 62 as shown in FIG. 3. The top portion 48 extends slightly beyond the conduit 30 to provide a preestablished distance between the top portion 48 and the conduit 30. The configuration of the passage 42 is less important than the relationship of the passage to the heat source which is the exhaust gases. Therefore, alternate passage configurations can be used without departing from the essence of the invention.

In this embodiment a rain cap 68 is removably attached to the conduit 30 at the end opposite the inlet 32. A sealing portion 70 of the rain cap 68 is positioned to be in sealing contact with the top portion 48 of the member 44 when the engine 10 is not in operation. Thus, the outlet 43 of passage 42 has a preestablished distance between the cap 68 and the conduit 30. A drain hole 72 is located in the conduit 30 near the inlet 32 and is positioned between the passage 42 and the atmosphere. A hole 73 is provided in the conduit 30. An inlet pipe 74 extends through the hole 73 into the passage 42 and is fixedly attached to the conduit 30. The pipe 74 has an attaching end 78 opposite the end extending into the passage 42.

A means 80 for connecting the oil separator 22 with the passage 42 is provided so that the constituents, droplets or oil vapor and unburned carbon particles coated with oil, within the crankcase fumes are burned and the remainder of the fumes are dissipated with the exhaust gases being discharged from the engine 10. The means 80 includes a flexible hose 82 attached at one end to the oil separator 22 and at the other end to the attaching end 78 of the pipe 74. A pair of conventional clamps 84 sealingly affix the hose 82 at each end.

INDUSTRIAL APPLICABILITY

In use, the exhaust gases from the engine 10 exit the exhaust manifold and muffler, enter the passage 45 and discharge at the outlet 47 of the exhaust system 23 to the atmosphere. Heat from the exhaust gases is absorbed by the member 44. The configuration of the tubular member 44 near the inlet 46 of the passage 45 provides a predetermined restriction to the flow of exhaust gases from the engine 10. Thus, greater heat is absorbed by the member 44 at this location. For example, the exhaust from the engine at the inlet 56 is at a temperature of about 450° C. (842° F.), therefore the temperature along the bottom portion of the member 44 is approximately 450° C. (842° F.) The closer the member 44 is positioned to the engine 10 the greater the heat content within the exhaust gases and the more effective the burning of the constituents will be. For example, the temperature of the exhaust gases exiting the engine are at about 815° C. (1500° F.) and progressively become cooler as they exit the exhaust system 23. Thus, the passage 42 should be positioned in heat absorbing relationship with the exhaust gases from the engine so that the temperature of the exhaust gases range between 815° C. (1500° F.) and 400° C. (752° F.).

The oil separator 22 separates the majority of the remaining oil droplets from the fumes and which are drained back to the oil pan 16. The remaining fumes which still include an oily mist and oil coated unburned carbon particles are exhausted from the oil separator 22 through the connecting means 80 into the passage 42. The oil coated unburned carbon particles and the droplets of oil which passed through the separator have a combustion temperature of about 400° C. (752° F.). When these particles are brought into contact with the heated tubular member 44, they burn or smolder reducing the quantity of unburned carbon particles and oil droplets. The burning takes place in the passage 42 near the preestablished cross-sectional area 60 between the member 44 and the conduit 30. After burning, the remaining fumes follow the passage 42 upward to the preestablished cross-sectional area 59 which controls the pressure in the crankcase 14. The fumes are then exhausted through the outlet 43 to the atmosphere. The exhaust gases from the engine 10 discharged from the passage 45 at the outlet 47 combines with the remaining fumes to further dissipate any oil vapors or unburned carbon particles which may have escaped from the engine 10.

The tubular member 44 extends above the conduit 30 a preestablished distance to insure that exhaust gases from the engine 10 are not driven back into the engine 10 through the passage 42. The drain hole 70 is provided in the conduit 30 so that any water condensing within the passage 42 or rain will not be trapped therein but can drain from the passage 42 to the atmosphere.

In view of the foregoing, it is readily apparent that the structure of the present invention provides an improved fumes disposal system which eliminates the problems caused by recirculating the oily carbon particles through the intake manifold of an engine or dissipating them with the fan and clogging the radiator. Furthermore, the system controls the pressure within the crankcase while eliminating the problems associated with direct pollution of the atmosphere by dumping the fumes direct from the engine. The system provides a simple fumes disposal system without requiring complex expensive separators and burners.

Other aspects, objects and advantages will become apparent from a study of the specification, drawings and appended claims.

What is claimed:

1. An engine crankcase fumes disposal system adapted for use with an engine having a crankcase, a conduit connected to the engine, said conduit having an inlet in fluid communication with the engine exhaust, said fumes including burnable constituents and nonburnable constituents, said system comprising:

means forming a passage in heat absorbing relationship with the exhaust gases from said engine for generating heat in the passage of a temperature sufficient to burn the burnable constituents, said passage having an outlet; and means for connecting the crankcase with the passage so that the burnable constituents within the crankcase fumes are burned and the remainder of the fumes are dissipated with the exhaust gases being discharged from the engine.

2. The engine crankcase fumes disposal system of claim 2 further including a preestablished cross-sectional area near the inlet of the conduit wherein said constituents are burned.

3. The engine crankcase fumes disposal system of claim 1 wherein said passage has an additional preestablished cross-sectional area near the outlet of the passage and said area is sized to maintain a preestablished pressure within the engine crankcase.

4. The engine crankcase fumes disposal system of claim 1 wherein said inlet of the passage is positioned adjacent the exhaust gases so that the temperature of the exhaust gases in heat absorbing relationship therewith is in the range of between 815° C. to 400° C.

5. The engine crankcase fumes disposal system of claim 1, further including a cap attached to the conduit and wherein said outlet of the passage has a preestablished distance between the cap and the conduit.

6. The engine crankcase fumes disposal system of claim 1 wherein said passage is formed by a member located substantially within the conduit.

7. An engine including a crankcase having fumes therein and said fumes including burnable constituents and nonburnable constituents, a conduit connected to the engine, said conduit having an inlet in fluid communication with the engine exhaust, means forming a passage in heat absorbing relationship with the exhaust gases from the engine for generating heat in the passage of a temperature sufficient to burn the burnable constituents, said passage having an outlet, and means for connecting the crankcase with the passage so that the burnable constituents within the crankcase fumes are burned and the remainder of the fumes are dissipated with the exhaust gases discharged from the engine.

8. The engine of claim 7 wherein said passage further includes a preestablished cross-sectional area positioned at the end opposite the outlet wherein said constituents are burned.

9. The engine of claim 7 wherein said passage has a preestablished cross-sectional area near the outlet, said area is sized to maintain a preestablished pressure within the engine crankcase.

10. The engine of claim 7 wherein said inlet of the passage is positioned adjacent the exhaust gases so that the temperature of the exhaust gases in heat absorbing relationship therewith is in a range of between 815° C. to 400° C.

11. The engine of claim 7 wherein said exhaust conduit is vertically positioned on the engine.

12. The engine of claim 11 wherein said passage is formed by a member located substantially within the conduit.

13. The engine of claim 11 wherein said conduit has a drain hole positioned between the passage and the atmosphere near the inlet in the conduit.

14. The engine of claim 7 further including a cap attached to the conduit and wherein said outlet of the passage has a preestablished distance between the cap and the conduit.

15. The engine of claim 7 wherein said passage is located substantially within the conduit.

16. An engine crankcase fumes disposal system adapted for an engine having a crankcase, an exhaust pipe and a conduit connected to the pipe, said conduit having an inlet in fluid communication with the exhaust pipe, said system comprising:

means forming a passage in heat absorbing relationship with the exhaust gases from said engine, said passage having an outlet;

means for connecting the crankcase with the passage so that the constituents within the crankcase fumes are burned and the reaminder of the fumes are dissipated with the exhaust gases being discharged from the engine; and a cap attached to the conduit and wherein said outlet of the passage has a preestablished distance between the cap and the conduit.

17. The engine crankcase fumes disposal system of claim 16 wherein said exhaust conduit is vertically positioned on the engine.

18. The engine crankcase fumes disposal system of claim 17 wherein said passage is formed by a member located substantially within the conduit.

19. The engine crankcase fumes disposal system of claim 16 wherein said conduit has a drain hole positioned between the passage and the atmosphere near the outlet in the conduit.

20. The engine crankcase fumes disposal system of claim 16 wherein said passage further includes a preestablished cross-sectional area positioned at the end opposite the outlet wherein the constituents are burned.

* * * * *

UNITED STATES PATENT AND TRADEMARK OFFICE
CERTIFICATE OF CORRECTION

PATENT NO. : 4,827,715

DATED : May 9, 1989

INVENTOR(S) : Robert C. Grant and John L. Johnson

It is certified that error appears in the above-identified patent and that said Letters Patent is hereby corrected as shown below:

Column 6, Claim 19, line 4, "outlet" should be --inlet--.

Signed and Sealed this

Tenth Day of April, 1990

Attest:

HARRY F. MANBECK, JR.

*Attesting Officer*  *Commissioner of Patents and Trademarks*